US011923899B2

(12) United States Patent
Jeong et al.

(10) Patent No.: US 11,923,899 B2
(45) Date of Patent: Mar. 5, 2024

(54) PROACTIVE WAVELENGTH SYNCHRONIZATION

(71) Applicant: HEWLETT PACKARD ENTERPRISE DEVELOPMENT LP, Houston, TX (US)

(72) Inventors: Hyunmin Jeong, Champaign, IL (US); Sai Rahul Chalamalasetti, Milpitas, CA (US); Marco Fiorentino, Milpitas, CA (US); Peter Jin Rhim, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 280 days.

(21) Appl. No.: 17/539,275

(22) Filed: Dec. 1, 2021

(65) Prior Publication Data
US 2023/0170991 A1 Jun. 1, 2023

(51) Int. Cl.
*H04B 10/079* (2013.01)

(52) U.S. Cl.
CPC .............................. *H04B 10/07955* (2013.01)

(58) Field of Classification Search
CPC ............ H04B 10/07955; H04B 10/564; H04B 10/572; H04B 10/0799; H04B 10/0797; H04B 10/07; H04B 10/70; H04B 10/58; H01S 5/0014
See application file for complete search history.

(56) References Cited

U.S. PATENT DOCUMENTS

| | | | |
|---|---|---|---|
| 2007/0030176 A1* | 2/2007 | Sanchez-Olea | H01S 5/0014 341/13 |
| 2017/0302373 A1* | 10/2017 | Yamakami | H04B 10/07955 |
| 2018/0159293 A1* | 6/2018 | Bovington | H04B 10/572 |
| 2019/0199602 A1 | 6/2019 | Zhang et al. | |
| 2019/0251169 A1 | 8/2019 | Loghmani | |
| 2019/0265952 A1 | 8/2019 | Peng et al. | |
| 2019/0303726 A1 | 10/2019 | Cote et al. | |
| 2020/0145100 A1* | 5/2020 | Huang | H04B 10/564 |
| 2020/0159778 A1 | 5/2020 | Mohanty et al. | |
| 2020/0367974 A1 | 11/2020 | Khalid et al. | |
| 2020/0410392 A1 | 12/2020 | Verma et al. | |

FOREIGN PATENT DOCUMENTS

| | | | |
|---|---|---|---|
| WO | WO-2018194456 A1 | 10/2018 | |
| WO | WO-2021023869 A1 | 2/2021 | |
| WO | WO-2021061040 A1 * | 4/2021 | ............ G06N 20/00 |

* cited by examiner

*Primary Examiner* — Hibret A Woldekidan
(74) *Attorney, Agent, or Firm* — Hewlett Packard Enterprise Patent Department (57) ABSTRACT

Examples described herein relate to a method for synchronizing a wavelength of light in an optical device. In some examples, a heater voltage may be predicted for a heater disposed adjacent to the optical device in a photonic chip. The predicted heater voltage may be applied to the heater to cause a change in the wavelength of the light inside the optical device. In response to applying the heater voltage, an optical power inside the optical device may be measured. Further, a check may be performed to determine whether the measured optical power is a peak optical power. If it is determined that measured optical power is the peak optical power, the application of the predicted heater voltage to the heater may be continued.

20 Claims, 6 Drawing Sheets

| PARAMETERS | TIME T-3 | TIME T-2 | TIME T-1 | TIME T | TIME T+1 |
|---|---|---|---|---|---|
| TEMP1 | 85 C | 90 C | 92 C | 93 C | |
| TEMP2 | 80 C | 75 C | 72 C | 70 C | |
| CPU UTILIZATION | 90% | 95% | 95% | 95% | |
| MEASURED OPTICAL POWER | 80 | 100 | 100 | 100 | |
| AMBIENT TEMPERATURE | 45 C | 46 C | 47 C | 48 C | |
| HEATER VALUE | 30 | 31 | 33 | 34 | 33 (PREDICTED VALUE) |

PROACTIVE WAVELENGTH SYNCHRONIZATION

STATEMENT OF GOVERNMENT RIGHTS

This invention was made with Government support under Agreement Number H98230-19-3-0002. The Government has certain rights in the invention.

BACKGROUND

Optical systems include optical devices that can generate, process, and/or carry optical signals from one point to another point. In certain implementations, optical systems such as optical communication systems may facilitate data communication over longer distances with higher bandwidth using smaller cable width (or diameter) in comparison to communication systems using electrical wires. In an optical communication system, data may be transmitted from an optical transmitter to an optical receiver over one or more channels via one or more optical fiber cables. In some systems, wavelengths of optical devices in the optical transmitters and optical receivers are synchronized for efficient data communication.

BRIEF DESCRIPTION OF THE DRAWINGS

Various examples will be described below with references to the following figures.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Traditional electricity-based data transfer has a limited bandwidth of a single channel over a single metal wire. On the other hand, the use of optical fiber cables in optical systems allow data transfer over multiple channels via a single optical fiber cable using different wavelengths of electromagnetic wave. Further, an optical system such as an optical transmitter, an optical receiver, and/or an optical transceiver may include various optical devices such as, but not limited to, light sources (e.g., lasers), optical modulators, optical filters, optical amplifiers, optical couplers, waveguides, optical combiners, optical multiplexers, optical demultiplexers, optical resonators, or photodetectors (e.g., photodiodes). Data can be transmitted from one optical system or device to another optical system or device over multiple channels operating at different individual operating wavelengths using a single optical cable or multiple optical cables.

In order to provide reliable data transfers, the operating wavelengths of the channels may be synchronized between the optical transmitter and the optical receiver. Further, some photonic chips may include light monitoring systems that monitor optical power contained within one or more such optical devices. Measurements of optical power are useful in correcting the operating wavelengths of the channels to maximize the optical power in the presence of changing environmental conditions and aging. The operating wavelength of the optical device may be adjusted by applying thermal energy via a heater formed near the optical device. In some cases, to synchronize operating wavelengths, different voltages may be applied to the heater and a voltage value that maximizes the optical power inside the optical device may be identified and maintained.

Typically, such wavelength synchronization is performed during the initial setup of optical systems. However, changes in ambient conditions around an optical device can cause the operating wavelength of the optical device to vary, resulting in loss or reduction in optical power inside the optical device. During operation, various factors such as ambient heat and/or processing load on electronic devices such as processing units can impact the operating wavelengths. For example, variations in the ambient heat can cause operating wavelengths of the optical modulators at the optical transmitter and the optical demodulators at the optical receiver to go out of synchronization causing information loss and/or data corruption.

Certain reactive techniques correct such wavelength synchronization issues. Reactive wavelength synchronization techniques are performed after operating wavelengths go out of synchronization. As will be understood, once the operating wavelengths go out of synchronization, there are chances of data loss or malfunctioning of the optical modulators and the optical demodulators. Reactive wavelength synchronization techniques entail monitoring the optical power and determining a slope of an optical power curve. Typically, reactive wavelength synchronization techniques are prone to detecting false positives. For instance, in some cases, reactive techniques can detect local maximums causing the slope of the optical power curve to become zero momentarily which is not a true reflection of maximum optical power. In order to detect a true maximum optical power, in some circumstances, it is necessary to perform a full sweep of the optical power. In particular, the full sweep entails applying several different heater voltages and determining optical power for each heater value, and then determining the maximum optical power. In such a process, due to the application of several different heater voltages across a range of optical powers, the operating wavelength of the optical device may go out of synchronization leading to corruption or loss of data transfer. Also, due to application of the several different heater voltages, the use of the full sweep is time-consuming.

In accordance with one or more examples presented herein, a method for proactively synchronizing an operating wavelength of light in an optical device is presented. In some examples, a heater voltage may be predicted for a heater disposed adjacent to the optical device in a photonic chip. The predicted heater voltage may be applied to the heater to cause a change in the operating wavelength of the light inside the optical device. In response to applying the heater voltage, an optical power inside the optical device may be measured. Further, a check may be performed to determine whether the measured optical power is a peak optical power. If it is determined that measured optical power is the peak optical power, the application of the predicted heater voltage to the heater may be continued.

As will be appreciated, the photonics controller, using a machine learning inference (MLI) model, may predict the heater value that can maximize the optical power output for the optical device. In particular, with the use of the MLI model that is trained for the actual global maximum trends, chances of false positives caused due to local maximums may be avoided. Further, as the heater voltage applied to the heater is a predicted value that can maximize the optical power, it may be possible to detect a true maximum optical power (or a sufficient approximation thereof) while avoiding a voltage sweep. This may result in reduced demand for computing resources (e.g., access to processing units, logic units, registers, etc.) consumed for wavelength synchronization. Moreover, because such an approach controls the heater proactively rather than reactively, the chances of synchronization loss are diminished.

Figure 1:
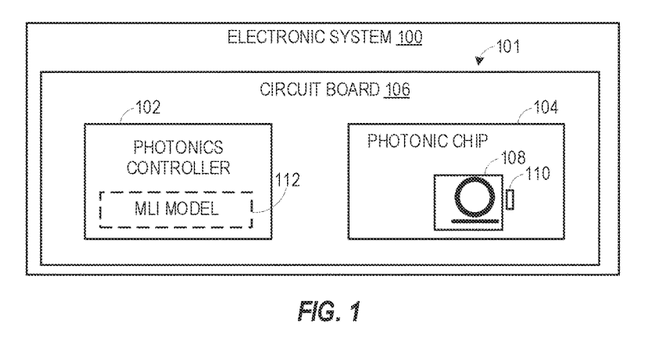
FIG. 1 depicts an example electronic system including a photonics controller and a photonic chip.

Referring now to the drawings, in FIG. 1, an example electronic system 100 is presented. The electronic system 100 may be a system that may include processing resources, electronic circuits, and/or storage medium to store, retrieve, and/or process data. Examples of the electronic system 100 may include, but are not limited to, computers (stationary or portable), servers, storage systems, wireless access points, network switches, routers, docking stations, printers, or scanners. The electronic system 100 may be offered as a stand-alone product, a packaged solution, and can be utilized on one-time full product/solution purchase or pay-per-use basis.

In some examples, the electronic system 100 may include one or more multi-chip modules, for example, a multi-chip module (MCM) 101 to process and/or store data and/or signals. The MCM 101 may include at least one electronic chip such as a photonics controller 102 and at least one photonic chip such as a photonic chip 104 mounted on a circuit board 106. In some other examples, both the photonics controller 102 and the photonic chip 104 may be packaged into a single integrated circuit chip and such integrated circuit chip may be mounted on the circuit board 106. The circuit board 106 may be a printed circuit board (PCB) that includes electrically conductive traces (not shown) to interconnect the photonics controller 102 and the photonic chip 104 with each other and/or with other components disposed on or outside of the PCB. Non-limiting examples of the photonics controller 102 may be implemented using an integrated circuit (IC) chip such as, but not limited to, an application-specific integrated circuit (ASIC), a field-programmable gate array (FPGA) chip, a processor chip (e.g., central processing unit and/or graphics processing unit), a microcontroller, or a special-purpose processor. Although not shown, in some examples, the MCM 101 may also include a board management controller (also sometimes referred to as a manageability controller, see FIGS. 5-6, for example), one or more central processing units (CPUs), one or more graphics processing units (GPUs), one or more memory chips, a wireless communication module chip, power supply chips or modules, electronic devices such as capacitors, inductors, resistors, sensors such as temperature sensors, or the like. During the operation of the MCM 101, the photonics controller 102 may send control and/or data signals to the photonic chip 104.

The photonic chip 104 may include one or more optical devices such as but not limited to, optical converters, optical cables, waveguides, optical modulators (e.g., ring modulator), optical demodulators (e.g., ring demodulator), resonators, light sources (e.g., lasers), and the like. The photonic chip 104 may function as an optical receiver, optical transmitter, optical transceiver, optical communication and/or processing medium for data and control signals received from the photonics controller 102. For illustration purposes, in FIG. 1, the photonic chip 104 is shown to include a single optical device 108, such as a ring modulator. The use of a different number of optical devices or the use of several different types of optical devices in the photonic chip 104 is also envisioned within the scope of the present disclosure. In one example, the optical device 108 may operate at a particular operating wavelength, hereinafter referred to as an operating wavelength, at which optical power inside the optical device 108 will be at a maximum. The operating wavelength may be a resonant wavelength of the optical device 108 which may depend on certain physical design parameters of the optical device 108 and/or on ambient conditions surrounding the photonic chip 104.

To allow controlled tuning of the operating wavelength of the optical device 108, the photonic chip 104 may include a thermal element, for example, a heater 110 that is disposed adjacent to the optical device 108. The heater 110 may be a resistive heating element or other type of element configured to generate and/or release heat. The photonics controller 102 may be configured to control the application of voltage to the heater 110 to adjust the amount of heat generated by the heater 110. The heat generated by the heater 110 may locally heat the optical device 108 causing a local change in the refractive index of the material of the optical device 108. The change in the refractive index may cause the operating wavelength of the optical device 108 to vary. Therefore, in some examples, by varying the voltage applied to the heater 110, the operating wavelength of the optical device 108 may be modified. In other examples, the voltage applied to the heater may be varied to compensate for changes in ambient conditions, thereby causing the operating wavelength of the optical device 108 to remain at a constant, or near-constant, value.

As will be understood, if not remedied, variations in ambient conditions can cause variations in an operating wavelength of an optical device. The photonics controller 102, in accordance with aspects of the present disclosure, may proactively adjust the heat generated by the heater 110 thereby mitigating or reducing the impact of varying ambient conditions on the operating wavelength of the optical device 108. In particular, the photonics controller 102 may adjust the voltage applied to the heater 110 to maintain the operating wavelength of the optical device 108 near a target value to mitigate loss of optical signals. The photonics controller 102 may control the heat generated by the heater 110 based on learning of historical data associated with the voltages applied to the heater 110, certain operating parameters associated with the MCM 101, and/or ambient parameters.

In some examples, the photonics controller 102 may run a machine learning inference (MLI) model 112 to predict a heater voltage. The MLI model 112 may be implemented using machine learning techniques such as recurrent neural network (RNN) techniques. More particularly, in one example, the MLI model 112 may be implemented using multivariate long short-term memory (LSTM) networks. The MLI model 112 may use historical information corresponding to temperature measurements via one or more temperature sensors, processing loads (e.g., CPU loads), historical optical power measurements for the optical device 108, ambient conditions, previous heater voltages applied to the heater 110, or combinations thereof to predict heater voltages. The photonics controller 102 may apply a predicted voltage to the heater 110 to maximize optical power within the optical device 108. The photonics controller 102 may continue to apply the predicted heater voltage to the heater 110 at which the maximum optical power is measured within the optical device 108. Details of the operations performed by the photonics controller 102 to proactively adjust the operating wavelength of the optical device 108 are described in conjunction with the method of FIG. 2.

Figure 2:
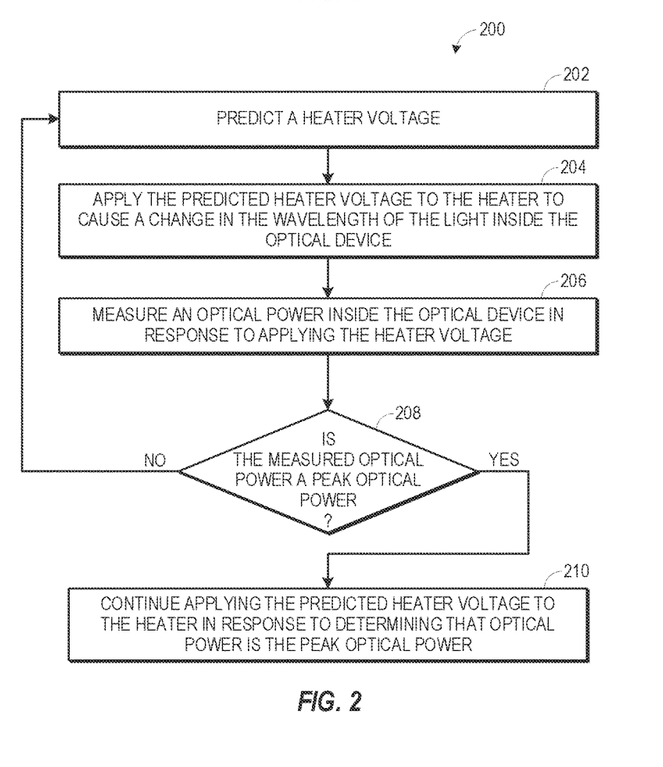
FIG. 2 depicts a flow diagram of an example method for proactively adjusting an operating wavelength of an optical device.

Referring now to FIG. 2, an example method 200 for proactively adjusting the operating wavelength of an optical device such as the optical device 108 of FIG. 1 is presented. For illustration purposes, FIG. 2 is described in conjunction with FIG. 1. In particular, in the example method 200, the operating wavelength of the optical device 108 may be proactively adjusted by way of adjusting the voltage (referred to as a heater voltage) applied to the heater 110 using a predicted voltage value. Although the steps in FIG. 2 are shown in an order, the order of steps shown in FIG. 2 should not be construed as the only order for the steps. The steps may be performed at any time, in any order. Additionally, the steps may be repeated or omitted as needed.

In some examples, the steps may be performed by any suitable device, such as, the photonics controller 102. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown). The processing resource may fetch, decode, and execute instructions, to proactively adjust the operating wavelength of the optical device 108. As an alternative or in addition to retrieving and executing instructions, the processing resource may include one or more electronic circuits that include electronic components for performing the functionality of one or more instructions, such as an FPGA, an ASIC, or other electronic circuits. A machine-readable storage medium may be any electronic, magnetic, optical, or other physical storage device that contains or stores executable instructions. Examples of the machine-readable storage medium may include, but are not limited to, Random Access Memory (RAM), non-volatile RAM (NVRAM), an Electrically Erasable Programmable Read-Only Memory (EEPROM), a storage device, an optical disc, and the like. In some examples, a machine-readable storage medium may be a non-transitory machine-readable storage medium, where the term "non-transitory" does not encompass transitory propagating signals.

At step 202, the photonics controller 102 may predict a heater voltage to be applied to the heater 110 that is disposed adjacent to the optical device 108 in the photonic chip 104. The photonics controller 102 may predict the heater voltage using machine learning techniques such as recurrent neural network (RNN) techniques. More particularly, in one example, the photonics controller 102 may predict the heater voltage using the MLI model 112 implemented using LSTM networks. The MLI model 112 may use historical information corresponding to temperature measurements via one or more temperature sensors, processing loads (e.g., CPU loads), historical optical power measurements for the optical device 108, ambient conditions, previous heater voltages applied to the heater 110, or combinations thereof to predict the heater voltage. Additional details of predicting the heater voltage are described in conjunction with FIGS. 3 and 4.

At step 204, in some examples, the photonics controller 102 may apply the predicted heater voltage to the heater 110. As will be understood, as the predicted heater voltage (different from a previously applied heater voltage) is applied to the heater 110, the refractive index of the optical device 108 may change causing the operating wavelength of the optical device 108 to change. The change in the operating wavelength may cause a change in the intensity of the light trapped inside the optical device 108. It may be noted that, in some situations, the predicted voltage may be the same as the voltage that is already being applied to the heater 110 and in such a case, the photonics controller 102 may continue to apply the same voltage to the heater 110.

At step 206, the photonics controller 102 may measure an optical power inside the optical device 108 in response to applying the predicted heater voltage. In one example, at least a portion of the light trapped inside the optical device may be routed to a photo-sensitive device such as a photodetector. The photodetector may convert the received light into an electrical signal (e.g., current). In particular, an output current of the photo-sensitive device may be indicative of the optical power inside the optical device 108. For example, a magnitude of the output current of the photo-sensitive device increases with an increase in the optical power inside the optical device 108, or vice-versa. Such electrical current may be measured by the photonics controller 102 to determine the optical power inside the optical device 108. The use of other techniques of measuring the optical power is also envisioned within the scope of the present disclosure.

Further, at step 208, the photonics controller 102 may perform a check to determine whether the measured optical power is a peak optical power by comparing the measured optical power with a value representative of a peak optical power. In one example, a value representative of a peak optical power may be preconfigured in the photonics controller 102. In some other examples, performing the check at step 208 may include determining by the photonics controller 102 whether the measured optical power is within a predetermined range from the peak optical power. If it is determined that the measured optical power is less than the peak optical power value (or is not within the predetermined range from the peak optical power, in another example), the photonics controller 102 may revert the change made to the heater voltage and predict a new heater voltage at step 202. However, at step 208 if it is determined that the measured optical power is the peak optical power (or is determined to be within the predetermined range from the peak optical power, in another example), the photonics controller 102, at step 210, may continue applying the predicted heater voltage to the heater 110. When the optical power inside the optical device 108 is determined to reach peak optical power by operating the heater 110 at the predicted heater voltage, the operating wavelength of the optical device 108 is said to be synchronized with a source (not shown) from which the optical device 108 is receiving data.

Figure 3:
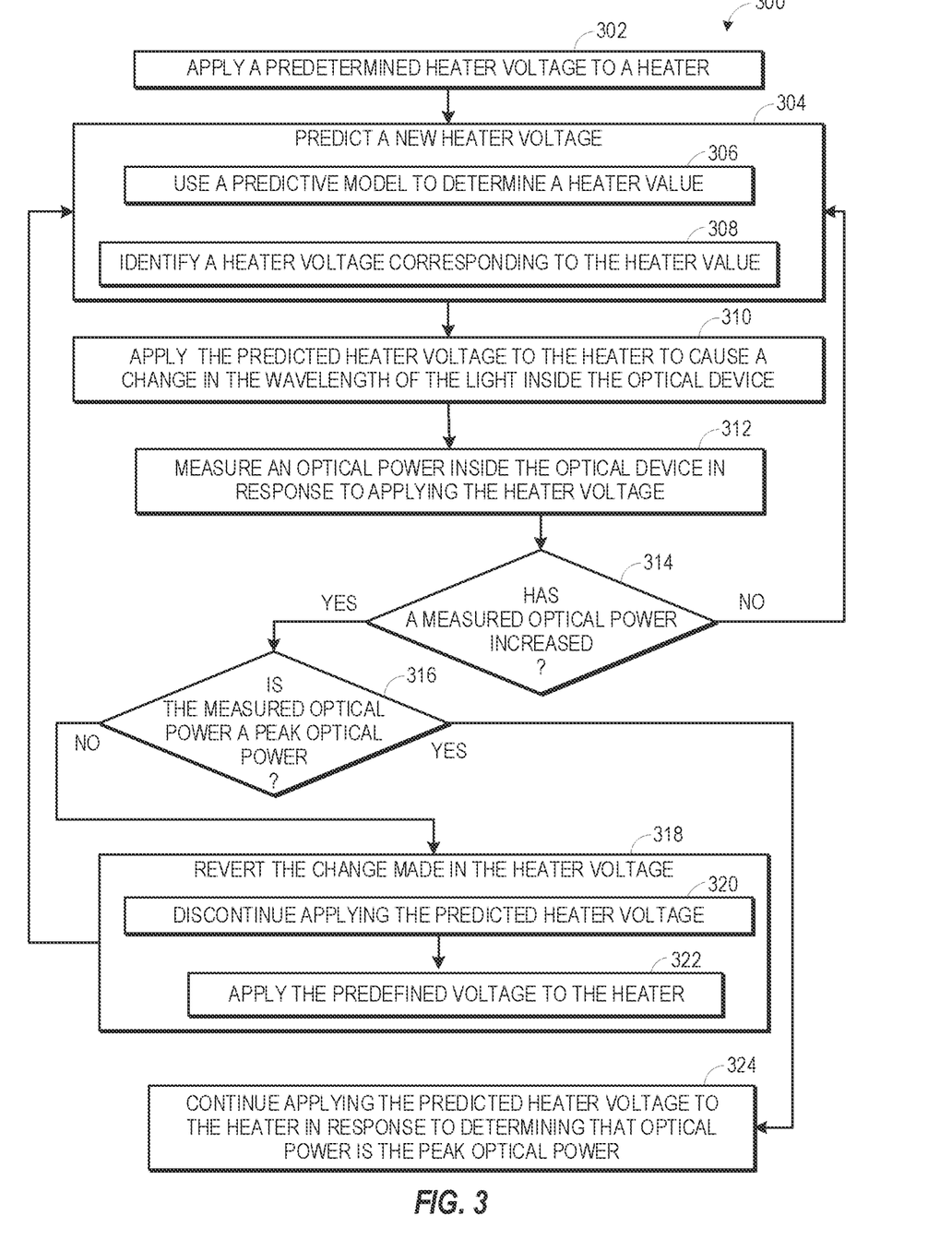
FIG. 3 depicts a flow diagram of another example method for proactively adjusting an operating wavelength of an optical device.

Turning now to FIG. 3, an example method for proactively adjusting the operating wavelength of an optical device such as the optical device 108 of FIG. 1 by proactively adjusting the heater voltage is presented. For illustration purposes, FIG. 3 is described in conjunction with FIG. 1. Although the steps in FIG. 3 are shown in an order, the order of steps shown in FIG. 3 should not be construed as the only order for the steps. The steps of the method 300 may be performed at any time, in any order. Additionally, the steps may be repeated or omitted as needed. In some examples, the steps may be performed by any suitable device, such as the photonics controller 102. The suitable device may include a hardware processing resource, such as one or CPUs, semiconductor-based microprocessors, and/or other hardware devices suitable for retrieval and execution of instructions stored in a machine-readable storage medium (not shown).

At step 302, the photonics controller 102 may apply a predetermined voltage (hereinafter referred to as predetermined heater voltage) to the heater 110 to set the operating wavelength of the optical device 108 to an initial setting. The initial setting of the operating wavelength may correspond to a value that is set up during the initial configuration of the optical device 108 for its operation. In order to obviate the impact of the ambient conditions and operating parameters of the MCM 101 on the operating wavelength, the photonics controller 102 may proactively adjust the heater voltage to maintain the operating wavelength at the initial setting. To that end, at step 304, the photonics controller 102 may predict a new heater voltage to maintain the operating wavelength at the initial setting or substantially close to the initial setting under a changed ambient condition, for example. Although not shown in FIG. 3, in some examples, the photonics controller 102 may perform operations at step 304 in response to determining that an ambient condition and/or an operating parameter for the MCM 101 has a predetermined amount of variation. For example, the photonics controller 102 may perform step 304 if a change in the ambient temperature is beyond ±5% and/or a change in the CPU utilization is ±10%. It is to be noted that the percentage values provided hereinabove are for the purpose of illustration only, such values may be customized without limiting the scope of the present disclosure.

Figure 4:
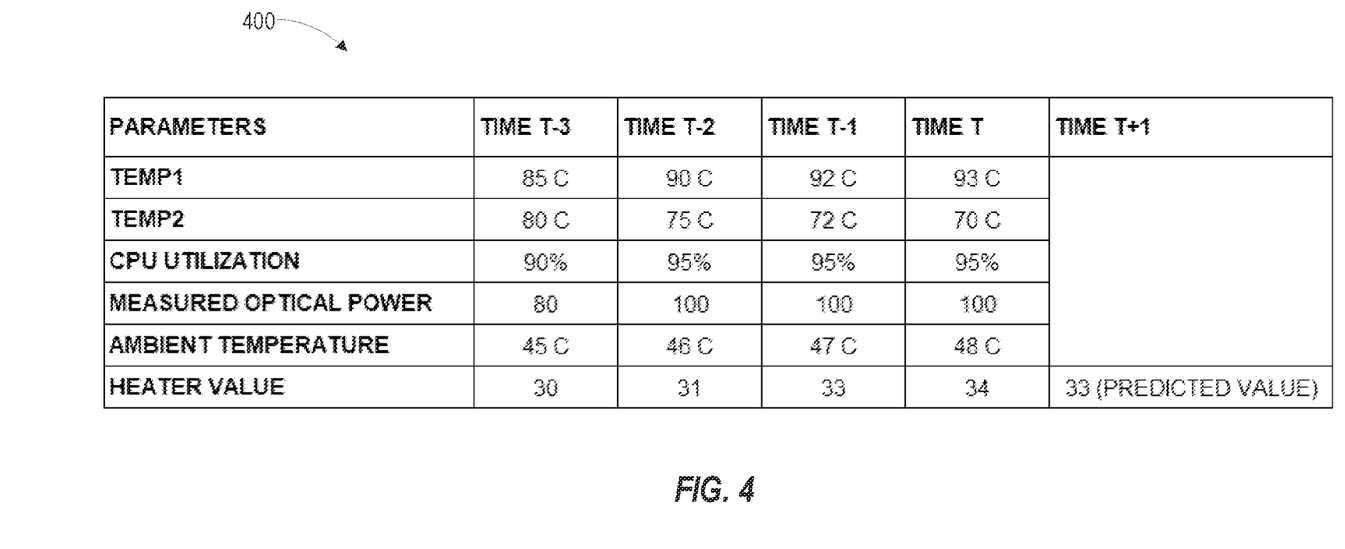
FIG. 4 depicts an example illustration of the prediction of the heater voltage by a photonics controller.

In some examples, to predict the new heater voltage at step 304, the photonics controller 102 may execute operations at steps 306 and 308. In particular, at step 306, the photonics controller 102 may use a predictive model such as an MLI model 112 to determine a heater value based on time series historical values of parameters such as, but not limited to, temperature measurements via one or more sensors, processing loads, measured optical power, ambient conditions, voltages applied to the heater, or combinations thereof. In some examples, the photonics controller 102 may use machine learning techniques such as RNN, more particularly, in one example, LSTM networks to predict the heater value required to maintain the operating wavelength of the optical device 108. The heater value may be a numeric value that is representative of (e.g., proportional to) the heater voltage. Prediction of the heater value by the photonics controller 102 is described with help of an illustration of FIG. 4. Referring now to FIG. 4, an example illustration 400 of the prediction of the heater voltage by the photonics controller 102 is depicted. As depicted in illustration 400, example historical values of parameters such as temperatures "TEMP1" and "TEMP2", CPU utilization, measured optical power, ambient temperature, and a heater value are shown. The historical values of the above-mentioned parameters are represented for several time instances such as, time T, time T-1, time T-2, and time T-3. In one example, the photonics controller 102 may maintain a mapping between heater values and respective predicted heater voltages.

Temperatures "TEMP1" and "TEMP2" may represent temperature measurements performed using respective temperature sensors (see FIGS. 5-6, for example) disposed on the MCM 101 or outside the MCM 101. In some examples, the temperatures "TEMP1" and "TEMP2" may directly be received by the photonics controller 102 or via a manageability controller such as a board management controller. The CPU utilization may represent the utilization of the main processing resource (e.g., CPU) disposed on the MCM 101 or other circuit boards in an electronic system hosting the MCM 101. In the example of FIG. 4, CPU utilization values of are represented as percentages, however, in some other examples, instructions per cycle, which may be an integer value, may be used. Also, for illustration purposes, the values of the measured optical power are represented as numeric values that are representative of the intensities of the light measured for the optical device 108. These historical values of the above-mentioned parameters may be provided to the MLI model 112 (e.g., LSTM network) running on the photonics controller 102. Using the MLI model 112, the photonics controller 102 may predict a heater value for time T+1. The predicted heater value may again be provided to the MLI model 112 as an input. For example, for the measured values of the temperatures "TEMP1" (e.g., 93 Celsius(C)) and "TEMP2" (e.g., 70 C), the CPU utilization (e.g., 95%), the measured optical power (e.g., value 100 shown in FIG. 1), the ambient temperature (e.g., 48 C), and the heater value (e.g., 34) at time T, the photonics controller 102, using an LSTM, may predict the heater value as 33, for example, as depicted in FIG. 4. This predicted value of 33 may be used as feedback to the LSTM.

Turning back to FIG. 3, at step 308, the photonics controller 102 may determine the heater voltage corresponding to the predicted heater value. In one example, the photonics controller 102 may maintain a mapping between heater values and respective predicted heater voltages. Once the predicted heater value is determined, the photonics controller 102 may perform a look-up into the mapping to identify the predicted heater voltage corresponding to the predicted heater value. Further, at step 310, the photonics controller 102 may apply the predicted heater voltage to the heater 110. As previously noted, the application of the predicted heater voltage may cause a change in the refractive index of the optical device 108 causing the operating wavelength of the optical device 108 to change. The change in the operating wavelength may cause a change in the intensity of the light trapped inside the optical device 108. Accordingly, at step 312, the photonics controller 102 may measure an optical power inside the optical device 108 in response to applying the predicted heater voltage.

Further, at step 314, the photonics controller 102 may perform a check to determine whether the measured optical power has increased in response to the application of the predicted heater voltage. The photonics controller 102 may compare the measured optical power with a previously measured optical power. For example, the photonics controller 102 may compare the measured optical power with an optical power that was measured when the predetermined heater voltage was applied to the heater 110. At step 314, if it is determined that the optical power has not increased in response to the application of the predicted heater voltage, the photonics controller 102 may again predict a new heater voltage at step 302 based on the instantaneous values of the parameters and using the MLI model 112 as described earlier.

However, at step 314, if it is determined that the optical power has increased in response to the application of the predicted heater voltage, the photonics controller 102 may perform another check at step 316. At step 316, the photonics controller 102 may perform a check to determine whether the measured optical power is a peak optical power. If it is determined that the measured optical power is less than the peak optical power, the photonics controller 102, at step 318, may revert the change made to the heater voltage by performing operations at steps 320 and 322, in one example. In particular, at step 320, the photonics controller 102 may discontinue applying the predicted heater voltage to the heater 110. Further, at step 322, the photonics controller 102 may apply the predetermined heater voltage (e.g., a voltage applied at step 302 prior to applying the predicted heater voltage) to the heater 110. Once the change made to the heater voltage is reverted, the photonics controller 102 may again predict a new heater voltage at step 302 based on the instantaneous values of the parameters and using the MLI model 112 as described earlier. In some examples, the photonics controller 102 may predict a new heater voltage and apply the new heater voltage to the heater 110 without reverting to the predetermined value.

However, at step 316 if it is determined that the measured optical power is the peak optical power, the photonics controller 102, at block 324, may continue applying the predicted heater voltage to the heater 110. When the optical power inside the optical device 108 is determined to have reached peak optical power while the heater is operated at the predicted heater voltage, the operating wavelength of the optical device 108 is said to be synchronized with a source (not shown) from which the optical device 108 is receiving data.

Figure 5:
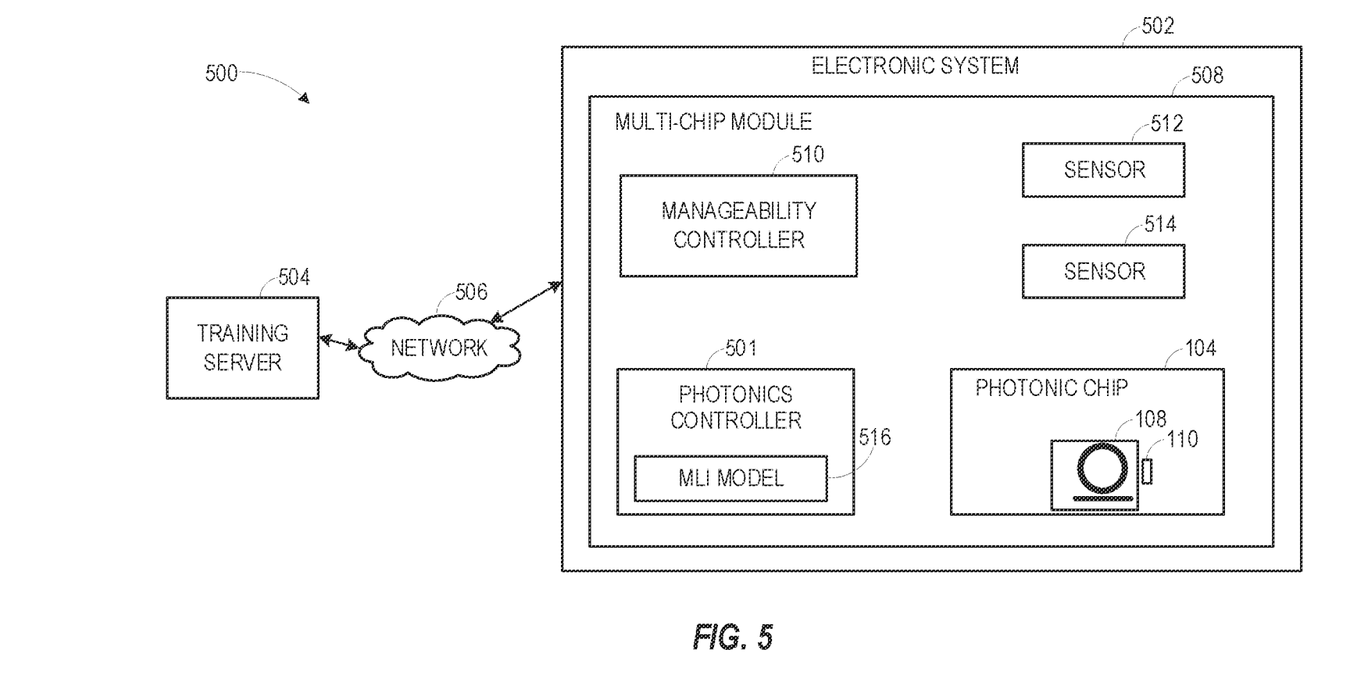
FIG. 5 depicts an example training architecture to train a machine learning inference (MLI) model that is used to proactively adjust an operating wavelength of an optical device.

In FIG. 5, an example training architecture 500 is presented. The example training architecture 500 may include an electronic system 502 and a training server 504 coupled to each other via a network 506. The electronic system 502 may be an example representative of the electronic system 100 of FIG. 1. The training server 504 may be any computing system, such as, a computer (stationary or portable), server, or a storage system, capable of storing, retrieving, and/or processing data. Examples of the network 506 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. In some examples, the network 506 may be enabled via private communication links including, but not limited to, communication links established via Bluetooth, cellular communication, optical communication, radio frequency communication, wired (e.g., copper), and the like. In some examples, the private communication links may be direct communication links between the electronic system 502 and the training server 504.

In one example, the electronic system 502 may include an MCM 508 which may be an example representative of the MCM 101 of FIG. 1. In some examples, the MCM 508 may include a photonics controller 501 and a photonic chip such as the photonic chip 104. The photonics controller 501 of FIG. 5 is an example representative of the photonics controller 102 of FIG. 1. The photonics controller 501 may host an MLI model 516, which is an example representative of the MLI model 112 of FIG. 1, to predict heater values. In some examples, the MLI model 516 may be hosted on the photonics controller 501 after the MLI model 516 is trained at the training server 504. Further, the MCM 508 may include a manageability controller 510 and various sensors such as sensors 512, 514. In the example of FIG. 5, the sensors 512, 514 may be temperature sensors that measure temperatures TEMP1 and TEMP2 (see FIG. 4), respectively. Use of other types of sensors is also envisioned within the purview of the present disclosure so long as the measurements by such sensors can be used in training the MLI model 516 and/or using the MLI model 516 during the operation of the MCM 508 to adjust the heater voltage applied to the heater 110.

The manageability controller 510 may also be referred to as a baseboard management controller (BMC), in some examples. The manageability controller 510 may be implemented using a separate processing resource (e.g., a processor) from the main processing resource (not shown) executing a host operating system (OS), if any, on the electronic system 502. In some examples, the manageability controller 510 may provide so-called "lights-out" functionality for the electronic system 502. For example, the lights-out functionality may allow a user (e.g., an administrator, a customer, or service personnel) to perform management operations on the electronic system 502 even if the host OS is not installed or not functional. Moreover, in one example, the manageability controller 510 may run on auxiliary power, thus the electronic system 502 need not be powered-on. In some examples, the manageability controller 510 may also have management capabilities for sub-systems (e.g., cooling system) of the electronic system 502.

Further, in certain examples, the manageability controller 510 may provide so-called "out-of-band" (OOB) services, such as remote console access, remote reboot and power management functionality, monitoring the health of the electronic system 502, access to system logs, and the like. The term OOB services as used herein may refer to any service provided by the manageability controller 510 execution of which does not interfere with instructions or workloads running on the main processing resource (not shown) of the electronic system 502. In some examples, the manageability controller 510 may include an interface (also referred to as a management channel) such as a network interface, and/or serial interface to enable communication with the manageability controller 510. For example, the manageability controller 510 may provide remote management access (e.g., system console access) from a remote system such as a remote computer system regardless of whether the electronic system 502 is powered on, whether primary subsystem hardware of the electronic system 502 is functioning, or whether the host OS is operating or even installed. The user may be able to access various functionalities offered by the manageability controller 510 by accessing a web console from the remote computing system (not shown), as well.

In the example implementation of FIG. 5, the training data for training the MLI model 516 may be collected at the MCM 508 and provided to the training server 504. In some examples, the sensors 512 and 514 are communicatively coupled to the manageability controller 510. In some examples, the manageability controller 510 may poll the sensors 512 and 514, periodically or at random intervals, to collect values of temperatures, e.g., TEMP1 and TEMP2. Further, in some examples, the manageability controller 510 may also maintain data regarding the CPU utilization and ambient temperature. Also, the photonics controller 501 may, periodically or at random intervals, collect values of heater voltages and optical power of the optical device 108 from the photonic chip 104. The values of the temperatures TEMP1 and TEMP2, the CPU utilization, the ambient temperature, the optical power, and the heater voltage may be transmitted from the electronic system 502 to the training server 504 as training data set. The training server 504 may train the machine learning algorithm using the received training data set.

In some examples, after the MLI model 516 is trained using the training dataset, the MLI model 516 may be deployed on the photonics controller 501 using which the photonics controller 501 may predict the heater voltages for the heater 110 for maintaining the operating wavelength of the optical device 108. In some examples, after the MLI model 516 is trained using the training dataset, the MLI model 516 may be deployed on other chips such as, the manageability controller 510 or any dedicated hardware implemented as an FPGA, ASIC, microcontroller, microprocessor, or the like.

Figure 6:
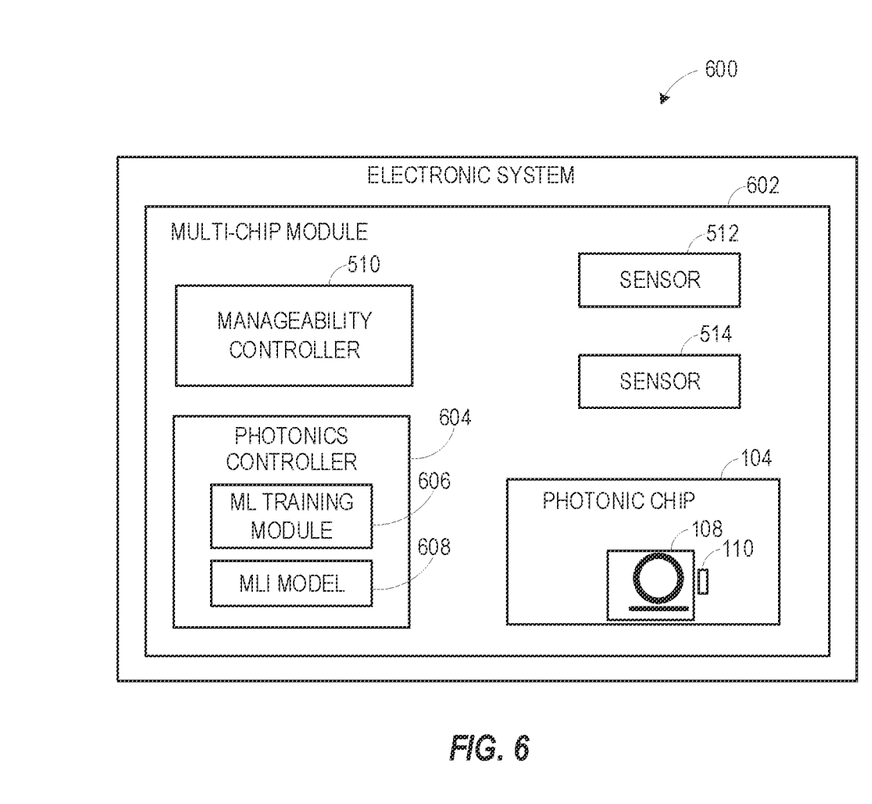
FIG. 6 depicts an example electronic system to train an MLI model that is used to proactively adjust an operating wavelength of an optical device.

Referring now to FIG. 6, an example electronic system 600 is presented to train an MLI model 608 that is used to proactively adjust an operating wavelength of an optical device. The MLI model 608 may be an example representative of the MLI model 112 of FIG. 1. The electronic system 600 of FIG. 6 may be an example representative of the electronic system 502 and is configured the train the MLI model 608 by itself. In some examples, the electronic system 600 may include one more MCMs such as the MCM 602 that is an example representative of the MCM 101 or the MCM 508. The MCM 602 may include one or more components that are similar to those described in FIG. 5. For example, the MCM 602 may include the photonic chip 104, the manageability controller 510, the sensors 512, 514, and a photonics controller 604. The photonics controller 604 may be an example representative of the photonics controller 102. In the example implementation of FIG. 6, the photonics controller 604 is additionally implemented with an ML training module 606 that is used to train the MLI model 608. In some examples, the ML training module 606 may also be implemented on a chip such as an integrated circuit chip, FPGA, ASIC, microcontroller, microprocessor, or combinations thereof, separate from the photonics controller 604 and the manageability controller 510. In certain examples, the ML training module 606 may be disposed on a separate MCM (not shown) than the MCM 602 in the electronic system 600.

In some examples, the training data for training the MLI model 608 may be collected at the MCM 602 by the manageability controller 510 and the photonics controller 604 and provided to the ML training module 606. For example, the manageability controller 510 may poll the sensors 512 and 514, periodically or at random intervals, to collect values of temperatures, e.g., TEMP1 and TEMP2. Further, in some examples, the manageability controller 510 may also maintain data regarding the CPU utilization and ambient temperature. Also, the photonics controller 604 may, periodically or at random intervals, collect values of heater voltages and optical power of the optical device from the photonic chip 104. The values of the temperatures, e.g., TEMP1 and TEMP2, the CPU utilization, the ambient temperature, the optical power, and the heater voltage may be provided to the ML training module 606 as training data set. The ML training module 606 may train the machine learning algorithm using the received training data set. After the MLI model 608 is trained using the training data set, the MLI model 608 may be deployed on the photonics controller 604 using which the photonics controller 102 may predict the heater voltages for the heater 110 for maintaining the operating wavelength of the optical device 108.

Figure 7:
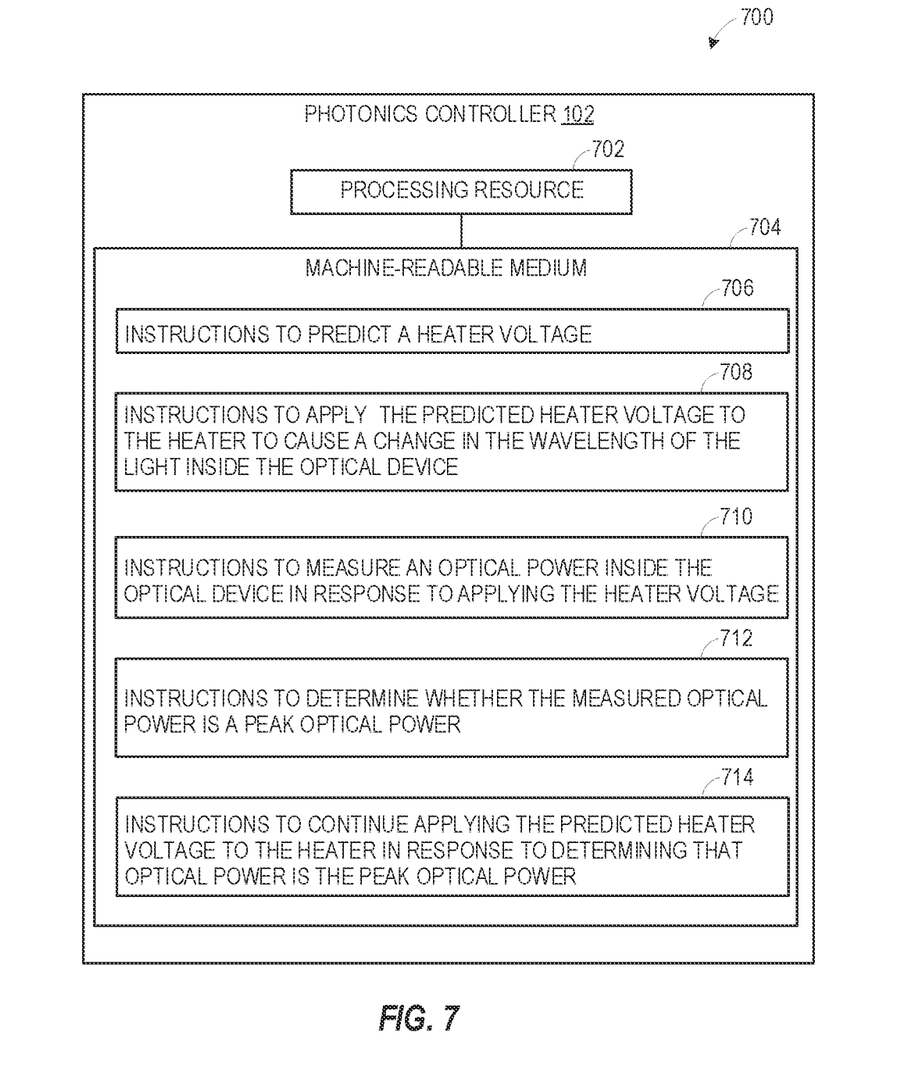
FIG. 7 depicts a block diagram of an example electronic system including a processing resource and a non-transitory machine-readable storage medium storing executable instructions to proactively adjust an operating wavelength of an optical device.

Referring now to FIG. 7, a block diagram 700 of an example control system, for example, the photonics controller 102 is presented. In some examples, the photonics controller 102 may be a processor-based system that performs various operations to proactively adjust an operating wavelength of the optical device such as the optical device 108 by applying predicted heater voltages to the heater 110. In some examples, the photonics controller 102 may be a device including a processor or a microcontroller and/or any other electronic component, or a device or system that may facilitate compute, data storage, and/or data processing, for example.

In some examples, the photonics controller 102 may include a processing resource 702 and a non-transitory machine-readable storage medium 704. The machine-readable storage medium 704 may be any electronic, magnetic, optical, or other physical storage device that may store data and/or executable instructions 706, 708, 710, 712, and 714 (collectively referred to as instructions 706-714). For example, the machine-readable storage medium 704 may include one or more of random-access memory (RAM), an Electrically Erasable Programmable Read-Only Memory (EEPROM), a storage drive, a flash memory, a Compact Disc Read-Only Memory (CD-ROM), or the like. As described in detail herein, the machine-readable storage medium 704 may be encoded with the executable instructions 706-712 to perform operations at one or more steps of the method described in FIGS. 2-3.

Further, the processing resource 702 may be a physical device, for example, one or more central processing units (CPUs), one or more semiconductor-based microprocessors, microcontrollers, one or more graphics processing unit (GPU), application-specific integrated circuit (ASIC), a field-programmable gate array (FPGA), other hardware devices, or combinations thereof, capable of retrieving and executing the instructions 706-714 stored in the machine-readable storage medium 704. The processing resource 702 may fetch, decode, and execute the instructions 706-714 stored in the machine-readable storage medium 704 for proactively adjusting the operating wavelength of the optical device 108. As an alternative or in addition to executing the instructions 706-714, the processing resource 702 may include at least one integrated circuit (IC), control logic, electronic circuits, or combinations thereof that include a number of electronic components for performing the functionalities intended to be performed by the photonics controller 102.

In some examples, the instructions 706 when executed by the processing resource 702 may cause the processing resource 702 to predict a heater voltage. Further, the instructions 708 when executed by the processing resource 702 may cause the processing resource 702 to apply the predicted heater voltage to the heater 110 to cause a change in the wavelength of the light inside the optical device 108. Furthermore, the instructions 710 when executed by the processing resource 702 may cause the processing resource 702 to measure an optical power inside the optical device 108 in response to applying the heater voltage. Moreover, the instructions 712 when executed by the processing resource 702 may cause the processing resource 702 to determine whether the measured optical power is a peak optical power. Additionally, the instructions 714 when executed by the processing resource 702 may cause the processing resource 702 to continue applying the predicted heater voltage to the heater 110 in response to determining that optical power is the peak optical power.

As will be appreciated, the photonics controller, using the MLI model, predicts the heater value that can maximize the optical power output for the optical device. In particular, the use of the MLI model that is trained for the actual global maximum trends, chances of false positives caused due to the local maximums can be avoided. Further, as the heater voltage applied to the heater is a predicted value that can maximize the optical power, full voltage sweep may be avoided resulting in reduced hardware access for the purpose of wavelength synchronization. Moreover, the proactive control of the heater voltage avoids or minimizes the chances of the wavelengths going out of synchronization.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method for synchronizing a wavelength of light in an optical device, the method comprising:
    predicting, by a photonics controller, a heater voltage for a heater disposed adjacent to the optical device in a photonic chip;
    applying, by the photonics controller, the predicted heater voltage to the heater to cause a change in the wavelength of the light inside the optical device;
    measuring, by the photonics controller, an optical power inside the optical device in response to applying the heater voltage;
    determining, by the photonics controller, whether the measured optical power is a peak optical power; and
    continue applying the predicted heater voltage to the heater in response to determining that optical power is the peak optical power.

2. The method of claim 1, wherein predicting the heater voltage comprises:
    using, by the photonics controller, a predictive model to determine a heater value based on time series values of parameters comprising temperature measurements via one or more sensors, processing load, measured optical power, ambient conditions, voltages applied to the heater, or combinations thereof; and
    identifying, by the photonics controller, the predicted heater voltage corresponding to the heater value.

3. The method of claim 2, wherein the predictive model is a multivariate long short-term memory (LSTM) network.

4. The method of claim 1, wherein measuring the optical power comprises measuring, by the photonics controller, an output current of a photo-sensitive device coupled to the optical device, wherein the output current of a photo-sensitive device is indicative of the optical power inside the optical device.

5. The method of claim 1, wherein determining whether the measured optical power is the peak optical power comprises comparing, by the photonics controller, the measured optical power with the peak optical power.

6. The method of claim 1, further comprising determining, by the photonics controller, whether the measured optical power has increased in response to the application of the predicted heater voltage.

7. The method of claim 6, wherein the determination as to whether the measured optical power is the peak optical power is performed in response to determining that the measured optical power has increased.

8. The method of claim 6, wherein the heater was applied a predetermined voltage prior to applying the predicted heater voltage.

9. The method of claim 8, further comprising reverting, by the photonics controller, a change made to a voltage applied to the heater in response to determining that the measured optical power has not increased.

10. The method of claim 9, wherein reverting the change made to the voltage applied to the heater comprises:
    discontinue, by the photonics controller, applying the predicted heater voltage to the heater; and
    applying, by the photonics controller, the predetermined voltage to the heater.

11. An electronic system, comprising:
    a multi-chip module comprising:
        a photonic chip comprising an optical device and a heater disposed adjacent to the optical device to control; and
        a photonics controller coupled to the photonic chip, wherein the photonics controller is to:
            predict a heater voltage using a machine learning inference model;

apply the predicted heater voltage to the heater to change an operating wavelength of the light inside the optical device;
measure an optical power inside the optical device in response to applying the heater voltage;
determine whether the measured optical power is a peak optical power; and
continue applying the predicted heater voltage to the heater in response to determining that optical power is the peak optical power.

12. The electronic system of claim 11, wherein the photonics controller determines whether the measured optical power is the peak optical power by comparing the measured optical power with the peak optical power.

13. The electronic system of claim 11, wherein the photonics controller is to determine whether the measured optical power has increased in response to the application of the predicted heater voltage.

14. The electronic system of claim 13, wherein the determination as to whether the measured optical power is the peak optical power is performed in response to determining that the measured optical power has increased.

15. The electronic system of claim 11, wherein the photonics controller is to:
apply a predetermined voltage to the heater prior to applying the predicted heater voltage; and
revert a change made to a voltage applied to the heater in response to determining that the measured optical power has not increased.

16. The electronic system of claim 15, wherein to revert the change made to the voltage applied to the heater, the photonics controller is to:
discontinue applying the predicted heater voltage to the heater; and
apply the predetermined voltage to the heater.

17. The electronic system of claim 11, wherein the photonics controller synchronizes the operating wavelength of the optical device without performing a full voltage sweep.

18. A non-transitory machine-readable storage medium storing instructions executable by a processing resource, the instructions, when executed by the processing resource, cause the processing resource to:
predict a heater voltage for a heater disposed adjacent to an optical device in a photonic chip;
apply the predicted heater voltage to the heater to change an operating wavelength of the light inside the optical device;
measure an optical power inside the optical device in response to applying the heater voltage;
determine whether the measured optical power is a peak optical power; and
continue applying the predicted heater voltage to the heater in response to determining that optical power is the peak optical power.

19. The non-transitory machine-readable storage medium of claim 18, further comprising instructions, when executed by the processing resource, cause the processing resource to determine whether the measured optical power has increased in response to the application of the predicted heater voltage, and wherein the determination as to whether the measured optical power is the peak optical power is performed in response to determining that the measured optical power has increased.

20. The non-transitory machine-readable storage medium of claim 19, further comprising instructions, when executed by the processing resource, cause the processing resource to determine whether the measured optical power has increased in response to revert a change made to a voltage applied to the heater in response to determining that the measured optical power has not increased.

* * * * *